United States Patent [19]

Segala

[11] Patent Number: 4,813,065
[45] Date of Patent: Mar. 14, 1989

[54] COMPUTERIZED TELEPHONE ACCOUNTING SYSTEM

[76] Inventor: James J. Segala, 5 Briarwood La., Wallingford, Conn. 06492

[21] Appl. No.: 107,562

[22] Filed: Oct. 13, 1987

[51] Int. Cl.⁴ .................. H04M 15/04; H04M 15/08; H04M 15/30
[52] U.S. Cl. .................................. 379/112; 379/114; 379/116; 379/120; 379/130
[58] Field of Search ............... 379/112, 114, 116, 120, 379/130, 133, 131; 235/91 E; 364/705

[56] References Cited

U.S. PATENT DOCUMENTS 4,585,904  4/1986  Mincone et al. .................... 379/131

Primary Examiner—Stafford D. Schreyer
Attorney, Agent, or Firm—Bachman & LaPointe

[57] ABSTRACT

A computerized telephone system, small and compact enough to fit within a standard size telephone instrument, automatically calculate the cost of any direct dialed long distance call within the United States and stores the cost information together with the number called, and the date, time and duration of the call, for display on a display unit or for production of a printed report. No operator data input is required.

10 Claims, 8 Drawing Sheets

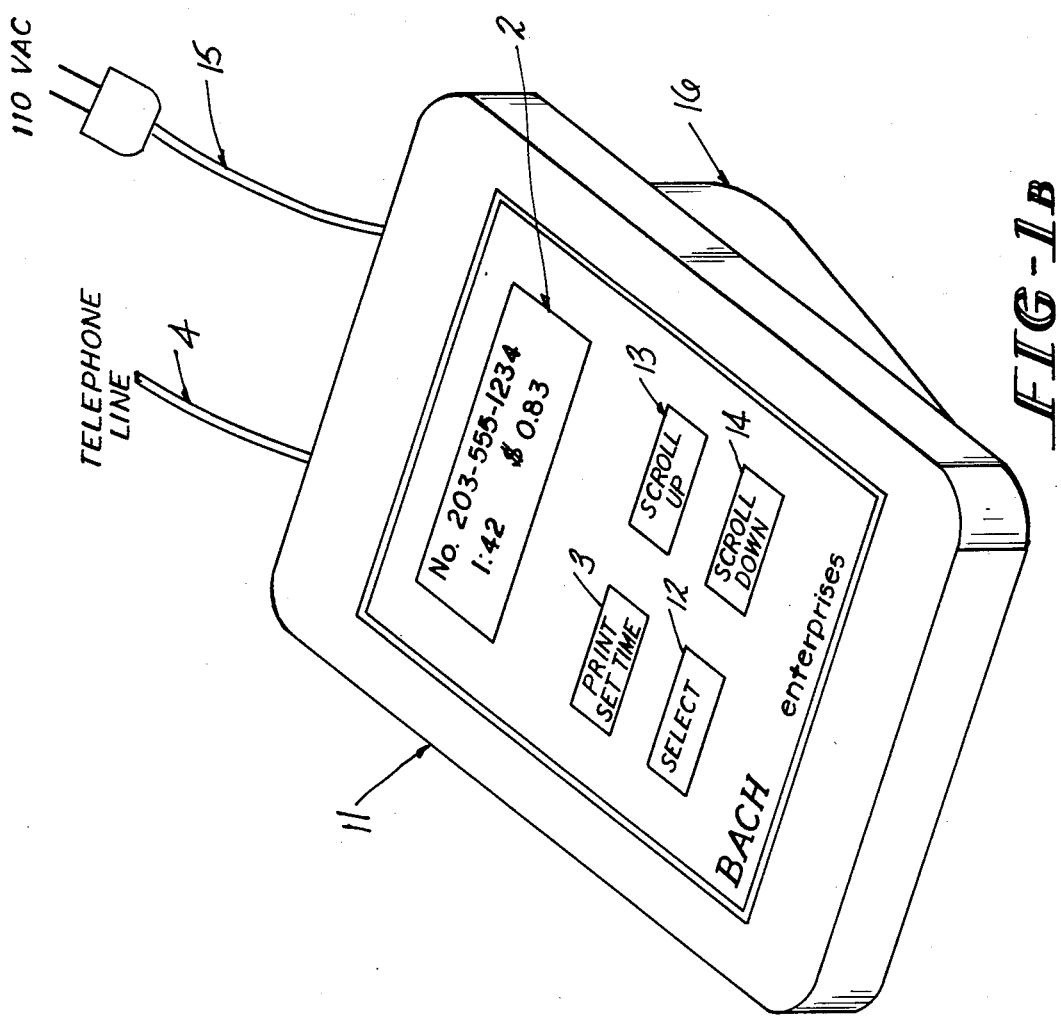

GENERAL OPERATION

PROCESS A CALL SUBROUTINE

LIST CALL
SUBROUTINE

INTERRUPT SUBROUTINE

SET CALENDER AND CLOCK SUBROUTINE

SEND LIST TO PRINTER SUBROUTINE

| Range | Contents |
|---|---|
| 0000-8191 | PROGRAMS |
| 8192-8447 | NPA LIST |
| 8448-8703 | NPA LOOKUP FOR LOCATIONS 9984-32767 |
| 8704-8911 | INTRALATA PRICES STORED BY MILEAGE BAND, DISCOUNT SCHEDULE (DAY, EVENING, NIGHT) FIRST MINUTE AND EXTENDED MINUTES. |
| 8912-9119 | INTERLATA - INTRASTATE PRICES |
| 9120-9327 | INTERSTATE PRICES |
| 9328-9359 | INTRALATA DISCOUNT SCHEDULE STORED BY DAY OF WEEK AND TIME OF DAY |
| 9360-9391 | INTERLATA-INTRASTATE DISCOUNT SCHEDULE |
| 9392-9423 | INTERSTATE DISCOUNT SCHEDULE |
| 9472-9727 | STATE ABBREVIATIONS |
| 9728-9983 | GENERAL STORAGE |
| 9984-32767 | -LIST OF ALL POSSIBLE CALL TO ANYWHERE IN THE CONTINENTAL UNITED STATES<br>-STORED IN BLOCKS BY NPA<br>-EACH NPA HAS A LIST OF NXX'S ASSOCIATED WITH EVERY CENTRAL OFFICE IN THAT NPA. WITH THE NXX'S ARE A MILEAGE BAND AND A CODE<br>CODE: 0 - LOCAL CALL<br>1 - INTRALATA CALL<br>2 - INTERLATA-INTRASTATE CALL<br>3 - INTERSTATE CALL<br>MILEAGE BAND: 0-15 USED TO LOOKUP THE PRICE OF THE CALL IN 8704-9327 |

EPROM MEMORY MAP

*FIG-9*

COMPUTERIZED TELEPHONE ACCOUNTING SYSTEM

BACKGROUND OF THE INVENTION

This invention relates to a computerized telephone accounting system, and more particular to one in which the required apparatus is sufficiently small and compact so as to be adapted to be contained within an individual telephone unit.

It has become customary for large companies typically to install a central telephone system, adapted to process all of the company's telephone traffic, including incoming and outgoing calls. These large systems provide many features such as call forwarding, automatic call back, conference calls, etc. In addition, such systems incorporate an accounting computer which logs information about each outgoing call, including the cost of such calls. Company management can use this information to contain telephone costs. Due to the rising cost of telephone communications, it is desirable for smaller business entities and individuals to have access to the same information, but systems are not available which can serve the purposes of small entities' or of individuals. The large systems currently available do not provide an economical solution to the needs of the small business or individual.

Recently, there has been a proliferation of different types of telephones, with features resembling portions of the larger systems, such as stored number dialing, etc. However, none of the systems heretofore proposed or available are able to provide cost accounting functions adapted for use by a small business or individual.

SUMMARY OF THE INVENTION

It is a principal object of the invention to provide a computerized telephone accounting system adapted to be connected to a user's telephone line, for calculating the cost of each and every outgoing direct dialed long distance telephone calls within the continental United States, and for logging information associated with each call such as the number dialed, the cost of the call, the date, time and length of the call, and for selectively displaying the logged information.

Another object of the present invention is to provide such apparatus in a small and compact unit so that it may be housed within a standard size telephone or housed in an enclosure no larger than that of a standard size telephone.

A further object of the present invention is to provide such apparatus which can be economically manufactured so as to allow the economical use of the apparatus by small businesses and individuals.

These and other objects and advantages of the present invention will become manifest by a review of the following description and the accompanying drawings.

In one embodiment of the present invention, there is provided apparatus for displaying information concerning the current cost of a call in progress, the number dialed, and the current length of such call. At the end of such call, the total cost of the call is displayed and this information is stored in a nonvolatile memory. Past calls stored in the memory may be viewed on the display, or supplied as input to a standard printer to produce a printed document similar in format to a standard telephone bill. The process of calculating the cost of each call is completely automatic and requires no input from the telephone user. All of the required information is derived from the telephone line attached to the equipment, and from an internal clock and calendar, and from a data base stored within the apparatus.

SUMMARY OF THE DRAWINGS

Reference will not be made to the accompanying drawings, in which:

FIG. 1B is a perspective view of an alternative embodiment of the present invention;

FIG. 9 is a memory map illustrating the mapping of data stored in the nonvolatile memory.

DESCRIPTION OF THE PREFERRED EMBODIMENTS

Figure 1A:
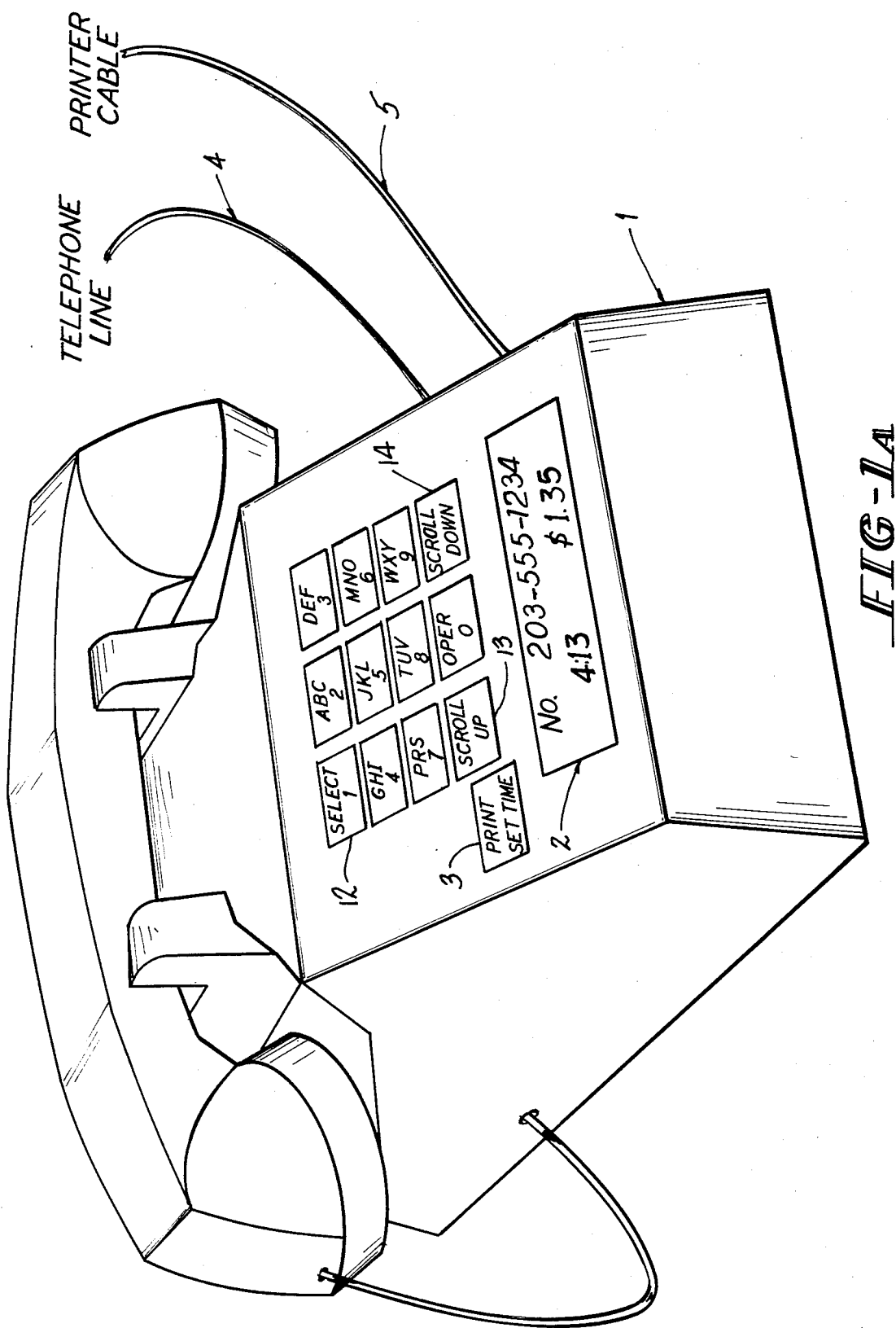
FIG. 1A is a perspective view of a telephone instrument incorporating an illustrative embodiment of the present invention.

FIG. 1A illustrates a telephone 1 which incorporates an illustrative embodiment of the present invention therein. The telephone unit has the conventional handset including transmitter and receiver, and a conventional keypad with 12 buttons for push button dialing. In addition to the normal 12 push buttons, a display 2 is provided on the face of the telephone unit, and an additional function control button 3, labeled "print set time", the function of which is described hereinafter. The display unit 2 provides a continuous display of the telephone number of a call in progress, with the duration and the current cost of the call. The telephone instrument is connected to a conventional telephone line 4, and is also connected to a line 5 which leads to a printer adapted for producing a printed record of cost and usage information.

FIG. 1B illustrates an alternative embodiment of the present invention, incorporated in a separate unit, smaller in size than a telephone unit, and having a case 11. The unit is small in size so that it can be placed at any convenient location. It is attached to the telephone line 4, and is attached to a source of AC power by a line cord 15. The front panel of the unit has the same display 2 and function control button 3 as described above in connection with FIG. 1A. In addition, three other buttons 12, 13 and 14 are provided for the control functions of select, scroll up and scroll down. These control buttons are not required on the apparatus of FIG. 1A, because their functions are controlled by the 1, * and # keys respectively. The unit 11 also has a connector 16 adapted to receive the connector cable of a standard printer.

Figure 2:
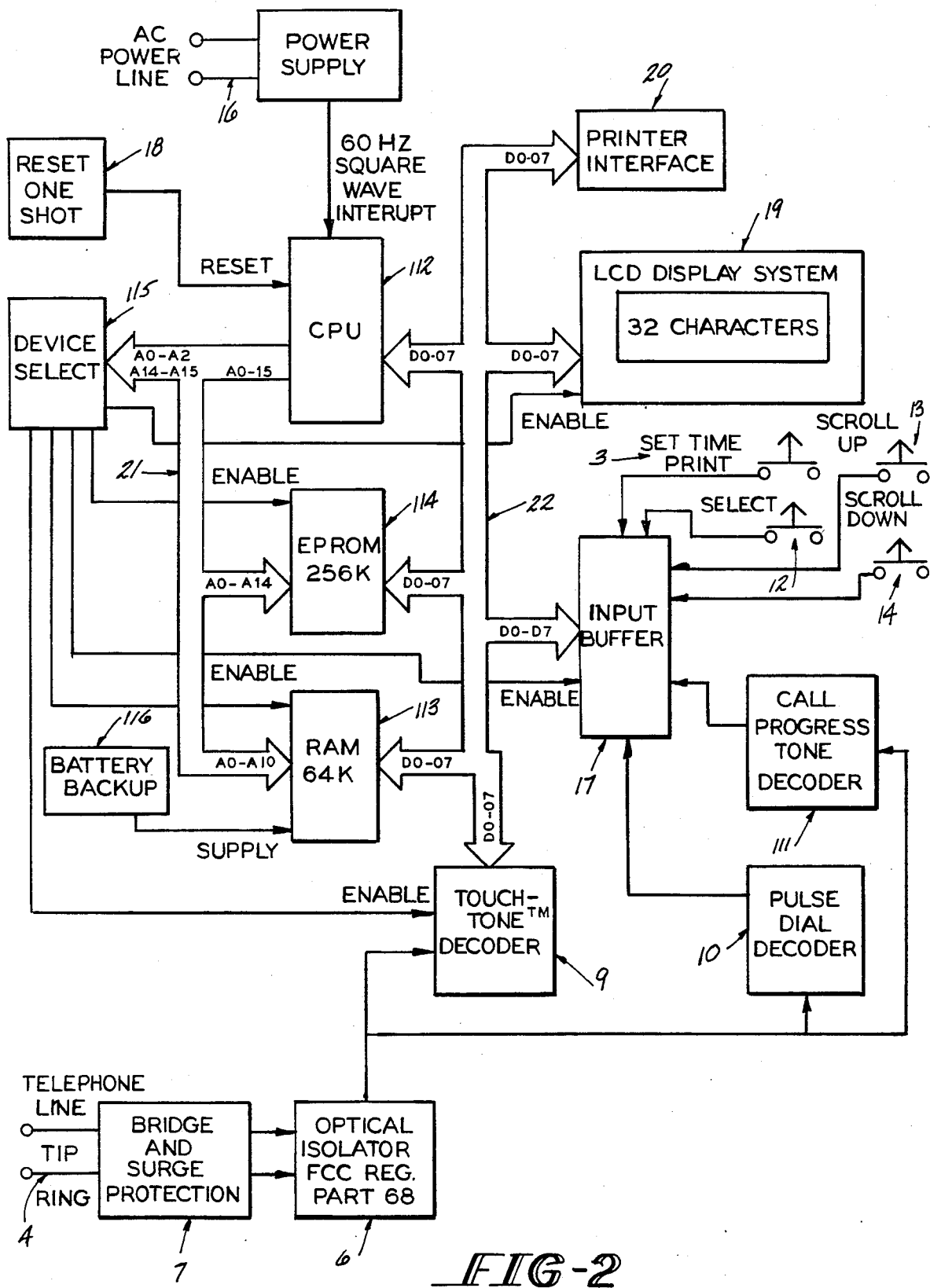
FIG. 2 is a functional block diagram of apparatus incorporating an illustrative embodiment of the present invention.

Referring to FIG. 2, a functional block diagram of an illustrative embodiment of the present invention is shown. The two wires of the telephone line 4, namely the tip and ring wires, are connected to inputs of a protection circuit 7, the outputs of which are connected as inputs to an optical isolator circuit 8, which complies with part 68 of the FCC regulations. The output of the isolator 8 is supplied to a dual tone decoder 9, to a pulse-dial decoder 10 and to a call progress tone decoder 111. The dual tone decoder 9 and the pulse-dial decoder 10 convert any conventional dialing pulses or tones present on the telephone line 4 into digital signals corresponding to the called telephone number, which is subsequently used to determine the destination of an outgoing call. The call progress tone decoder 111 detects audible tones present on the telephone line into digital signals to represent the operational state of a call in progress such as the handset being lifted (off back), dialing being completed, connection being made to a called party, ring and busy signals, reorder, called party answer and call termination. A central processing unit 112 is provided, which is interconnected over a data bus 22 with the tone decoder 9, and with an input buffer 17. The input buffer is connected to the outputs of the pulse-dial decoder 10 and call progress tone decoder 111, and is able to supply signals over the data bus 22 to the CPU 112 to indicate the various states of the call in progress, and the number being dialed if pulse dialing is used. When push button dialing is used, the tone decoder 9 supplies the data signals corresponding to the called telephone number directly to the bus 22. By this means, the CPU 112 receives information needed to determine the destination of a call, by signals from the tone decoder 9 or the pulse-dial decoder 10 and from the call progress tone decoder 111.

In the apparatus of FIG. 1A, the decoders 9 and 10 are not required, because the input buffer 17 is, in that case, connected to all of the keys of the keypad, and so there is no need to decode the number dialed from tones or pulses.

The address bus 22 is also connected to an electrically programmable read only memory or EPROM 114, and to a random access memory 113. The EPROM contains the stored program for controlling various procedures as described hereinafter, and the RAM is equipped with a battery backup 116, so that it functions as a nonvolatile memory. In other words, information written into the RAM is retained because of the power continuously supplied by the battery backup 116. The CPU 112 incorporates a conventional clock-calendar unit CC, which is continuously clocked by the AC power source 15, so the clock-calendar always manifests the correct date and time, for use in the logging procedures described hereinafter. These procedures allow the calculation of the cost of each call, on a current basis, and logging the call and its cost with the date and time that the call was made.

The data bus 22 is also connected to the display unit 19, which is provided for displaying up to 32 characters illustrating the telephone number of the current call, and its current duration and current cost.

An address bus 21 is connected to the CPU, to the EPROM 114 and the RAM 113, to allow the CPU to address individual memory locations within the EPROM and the RAM. The address bus is also connected to a device select unit 115, to allow the CPU to selectively enable the various units. By separate output lines from the device select unti 115, the display unit 19 may be enabled, the EPROM 114 unit may be enabled, the input buffer 17 may be enabled, the RAM 113 may be enabled, or the tone decoder 9 may be enabled. Although only one line is shown for each output from the device select unit 115, it will be understood that more than one line is used as necessary. For example, separate lines are used for enabling the RAM unit 113 for reading and writing, etc.

A power supply is provided for supplying necessary power to the CPU 112, and for this purpose is connected over lines 5 to an AC power line. A reset unit 18 is provided for resetting the CPU when desired, and is preferably connected to the power supply so that the CPU is reset when power is initially applied.

The data bus 22 is connected to a printer interface 20, which, as shown in FIG. 2, also incorporates the printer. Conventionally, the printer is connected to the other apparatus over a line such as the line 5 (FIG. 1A) and optionally through a connector like the connector 16 (FIG. 1B) so that the printer can be detached as desired.

Four of the push buttons of the push-button dialing keypad are connected to the input buffer, for selectively supplying signals to the input buffer in order to initiate various procedures, as described hereinafter.

The EPROM 114 stores, in addition to a stored program of operations, tables containing information as to the cost per unit time of telephone services for all possible destinations, and at all possible times of the day, during each day of the week. The RAM 113 is used as a scratch pad memory for calculations in progress, and also stores program variables and data obtained during each phone call. The battery backup 116 makes the RAM nonvolatile.

The power supply, in addition to supplying power to the CPU, also supplies a 60 Hertz square wave signal to the interrupt terminal of the CPU, so that the internal clock and calendar of the CPU may be updated, each 1/60th second, to maintain the correct time and date.

Figure 3:
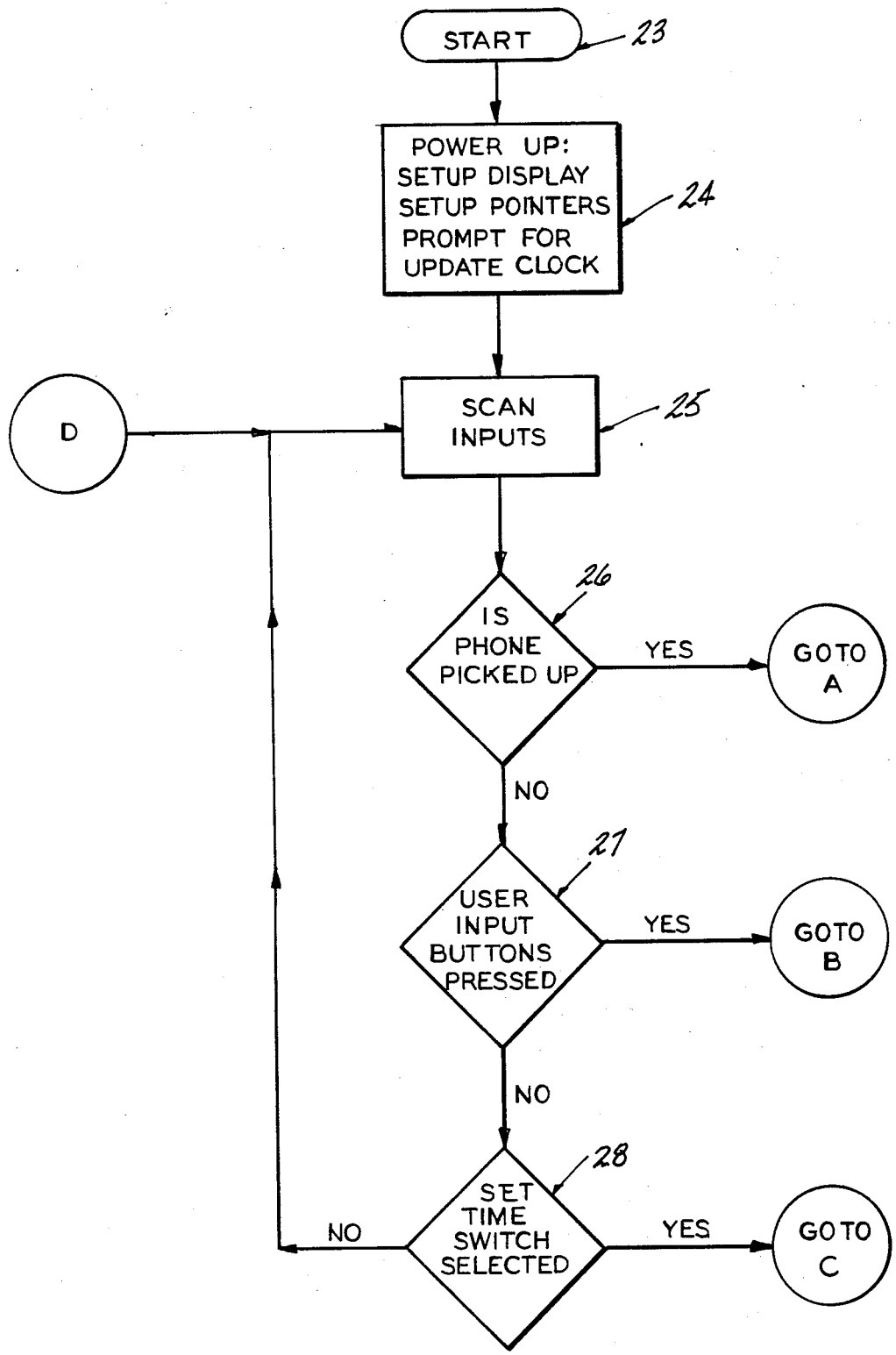
FIG. 3 is a flow chart showing the general operation of the apparatus of FIG. 2.
Figure 4:
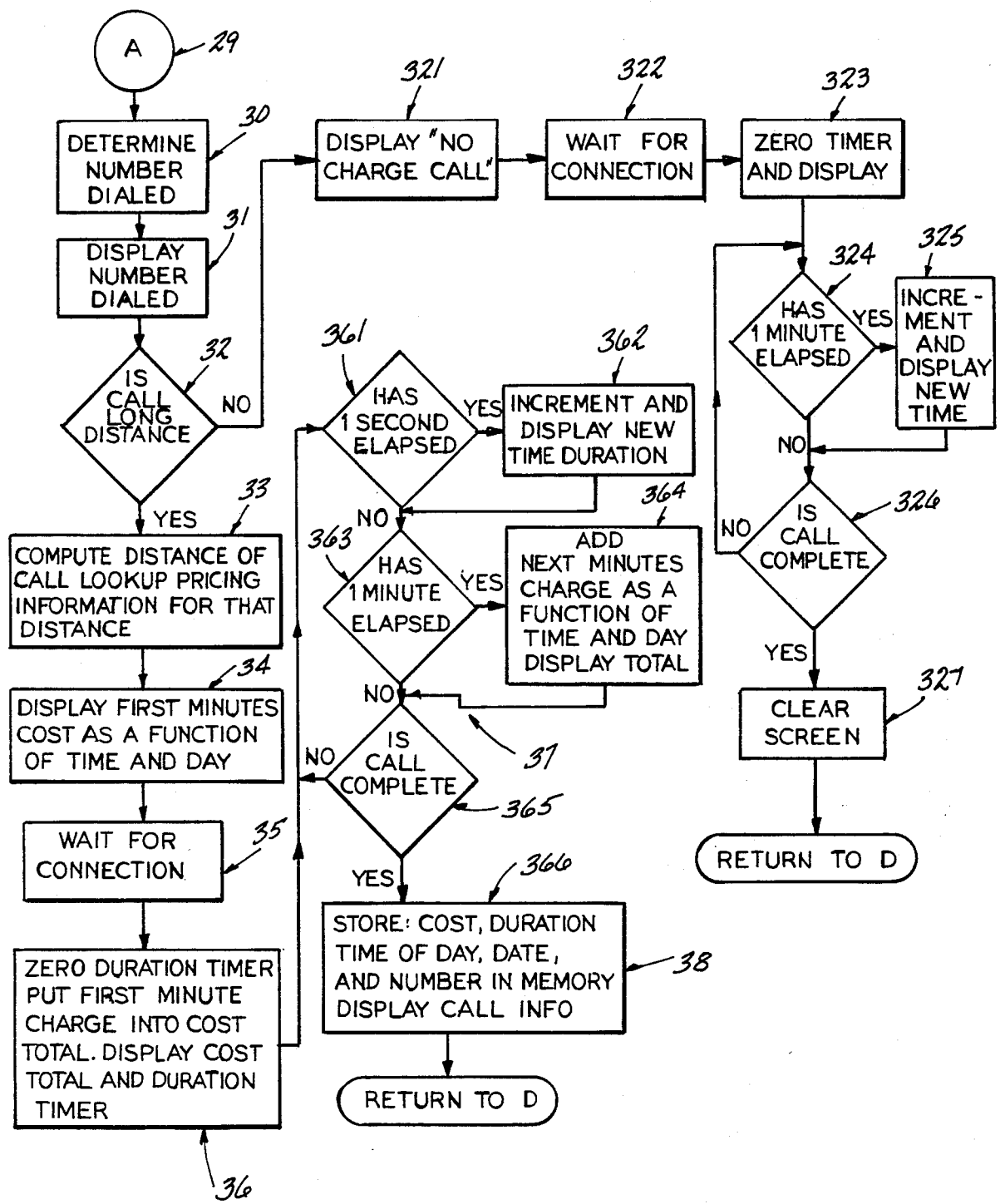
FIG. 4 is a flow chart showing the steps undertaken to process a call.

FIG. 3 is a flow chart showing the general operation of the apparatus of FIG. 2. The blocks of the flow chart represent steps carried out in performance of the method of the present invention when the CPU 112 is employed. Optionally, they may be taken to represent hardware apparatus for performing the functions as described hereinafter. Thus, in referring to the flow charts of FIGS. 3-8, these blocks will be referred to as units. When power is first applied to the unit, the power-on reset 18 passes control to unit 24, from starting condition 23, so that the display is set up initially, and various pointers are initialized. A prompt for an update of the clock calendar is sent to the display screen, to indicate to the user that the time and date need to be reset. Then control passes to unit 25, which initiates scanning of various inputs.

First, unit 26 determines whether the phone has been picked up, namely whether there is an off hook condition. If so, control passes to the "A" procedure (FIG. 4), which processes a call as it is being made. Otherwise control passes to unit 27, which determines whether one or more of the function control or user input keys have been depressed, and if so, control passes to procedure "B" (FIG. 5), which is the list call procedure. Otherwise control passes to unit 28, which determines whether the set time switch is selected. If so, control passes to procedure C (FIG. 7), which sets the calendar and clock. Otherwise control returns to the unit 26 and the above progess is repeated. When any of the procedures "A", "B" and "C" is selected, control ultimately returns over path "D" to the unit 25 in order to repeat the above process.

When the phone is picked up, and the "A" procedure is selected, control passes to a unit 30 (FIG. 4), which determines the number being dialed. This employs signals developed by the tone decoder 9 or the pulse-dial decoder 10, using the spaces between tones and dial pusles, to decode each digit as it is dialed and store in the RAM 113. Alternatively, with the apparatus of FIG. 1A, the number dialed is detected directly from the push buttons on the keypad. When the number dialed is complete, control then passes to unit 31, by which the dialed number is displayed by the display unit 19. If the number dialed is not a long distance call, for example, because the initial digit is not a "1", unit 32 passes control to unit 321, which displays "no charge call" on the display unit 19. Then control passes to unit 322, which waits for a signal developed by the call progress tone decoder 111 indicating that a connection has been made. At this time unit 323 zeros an interal timer and displays zero in the display 19 to indicate the call duration and the initiation of the call.

The timer is automatically incremented by signals from the clock timer unit, so that it continues to manifest the duration of the call as the call continues. The unit 324 receives control, and determines from the state of the timer whether one minute has elapsed since the initiation of the call. If so, unit 325 receives control and causes the display 19 to display a number of minutes incremented by one, which indicates the number of minutes that the call has been continuing. Then unit 326 receives control, and if it determines the call is still continuing, control returns to the unit 324. Otherwise the unit 327 clears the screen and control returns to the main routine illustrated in FIG. 3 via path "D".

If unit 32 determines the call is a long distance call, then unit 33 receives control, which calculates the initial price for a call at that area code, using the area code digits of the dialed number, and the time of day from the clock calendar. Unit 34 displays the initial cost which has been calculated for the first minute, and unit 35 receives control and waits for a connection signal to be detected by the call progress tone decoder 111. When this occurs, unit 36 receives control, which zeros the control duration timer, and places the cost for the initial charge of the call into an accumulator which functions to accumulate the "cost total". Then the call duration and the cost total is displayed on the display unit 19.

After this, unit 361 receives control and determines whether one second has elapsed by checking the state of the call duration timer. If so, unit 362 increments the call duration time by one second and displays the new duration. Otherwise unit 363 determines whether a minute has elapsed. When a minute has elapsed in the duration of the call, unit 364 determines the charge for the next minute, as a function of the time and day, and adds this to the amount already in the accumulator, to calculate the current cost total. Then the new total is displayed which corresponds to the elapsed time displayed by the unit 362. Then unit 365 receives control and determines if the call is complete. If not, control returns to the unit 361 so that the call duration and total cost are continuously updated. Otherwise, control passes to unit 366, which stores the cost duration, time of day, date and called number in the RAM 113. This display then displays this information, and signals to the operator that the call has been completed. Then control returns to the executive routine of FIG. 3 via path "D".

Figure 5:
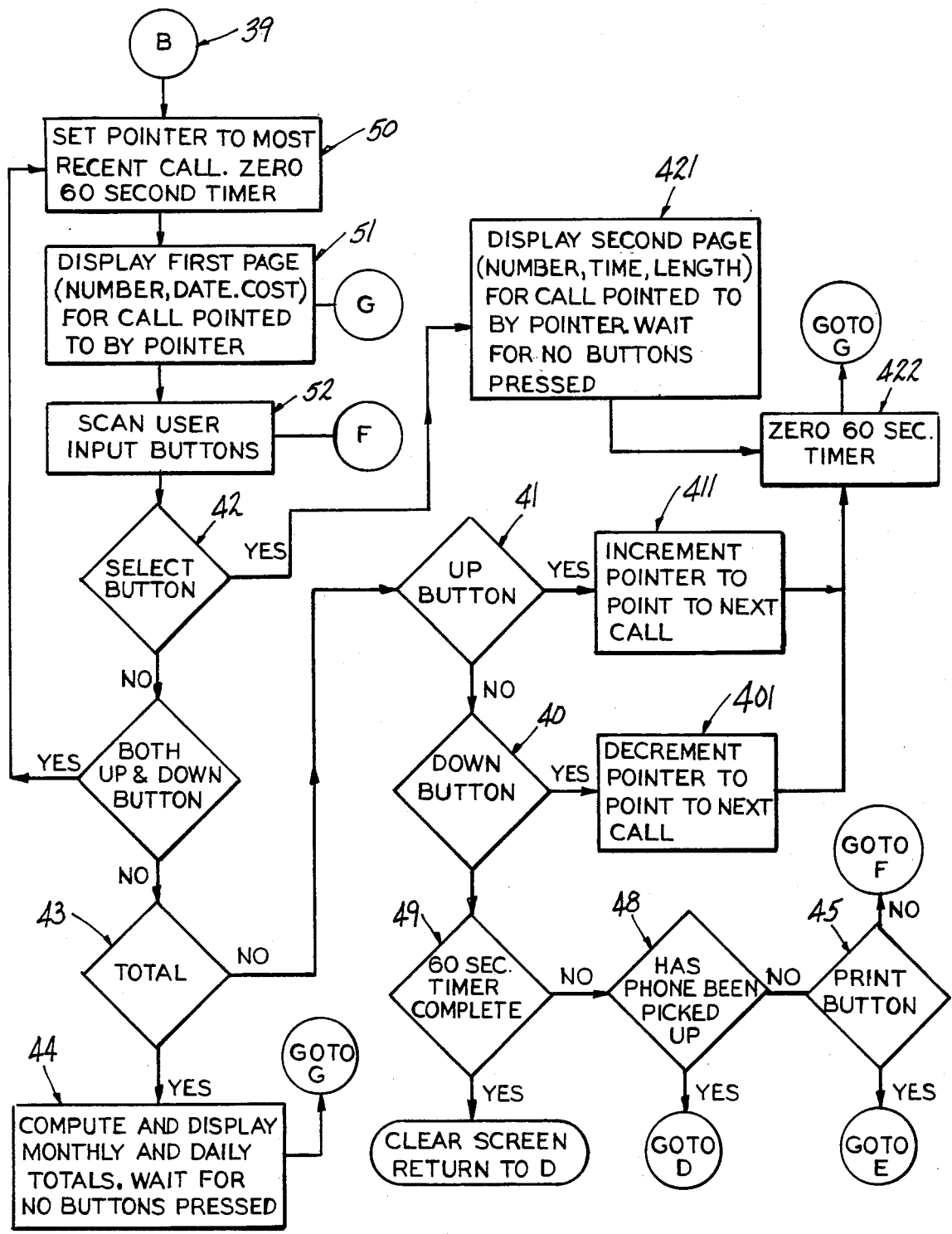
FIG. 5 is a flow chart showing the steps undertaken in listing a call.

When procedure "B" is selected from the executive routine in FIG. 3, control passes over path 39 to unit 50 of FIG. 5, in order to recall stored information for display in the display unit. Unit 50 sets a call pointer to the most recent call and resets a 60 second counter. Then control passes to unit 51, which displays the telephone number, date and cost for the call associated with the current state of the pointer. Then control passes to unit 52, which initiates a scan of the user input buttons, corresponding to the four control function keys 3 and 12-14.

If unit 42 determines that the select key has been pressed a single time, then unit 421 receives control and the display is caused to show the number dialed, the time of day, and the length of call. Then unit 422 receives control, which zeros the 60 second timer, after which control returns via path "G" to unit 51.

After the unit 42, if the unit 53 finds that both of the scroll buttons are not simultaneously depressed, control passes to unit 43, which determines whether the select key is depressed a second time. If so, control passes to unit 44, which computes and displays the monthly and daily totals for the month and day of the call which is pointed to by the call pointer. This display persists as long as the select key is pressed, after which control returns to unit 51 via path "G". A third depression of the select key, or presseing either of the scroll keys, restores the display to the number dialed, date and cost of call.

If unit 43 determines that the select key has not been depressed a second time, then unit 41 inspects whether the scroll up key has been depressed. If so, unit 411 receives control, which increments the call pointer to point to the next call, after which the 60 second timer is reset by unit 422, and control returns to unit 51. If the scroll up key is not depressed, unit 40 determines whether the scroll down key has been depressed. If so, unit 401 receives control, which decrements the pointer to point to the previous call, and control passes via unit 422 to unit 51. In either case, the stored information for the next or previous call is displayed.

If no function control button has been pressed, then unit 49 receives control which determines whether the 60 second timer has timed out. If yes, control returns to the executive routine (FIG. 3) over path "D". Otherwise, control passes to unit 48 which determines whether the phone has been picked up, and if so, control returns immediately to the executive routine in FIG. 3. Otherwise unit 45 determines whether the print key has been depressed and if so, control passes to the procedure in FIG. 8 over path "E". Otherwise control returns over path "F" to unit 52, and the above routines are repeated.

Figure 6:
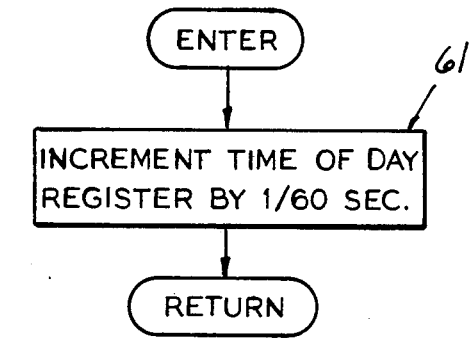
FIG. 6 is a flow chart showing an interrupt subroutine.

FIG. 6 illustrates the interrupt subroutine. During each cycle of the 60 cycle power source connected to the CPU, as illustrated in FIG. 2, the CPU accepts an interrupt and increments the time of day by 1/60th of a second. At the end of 60 seconds there is a carry over to a register storing the data for minutes, and so on for hours, days, months, etc.

Figure 7:
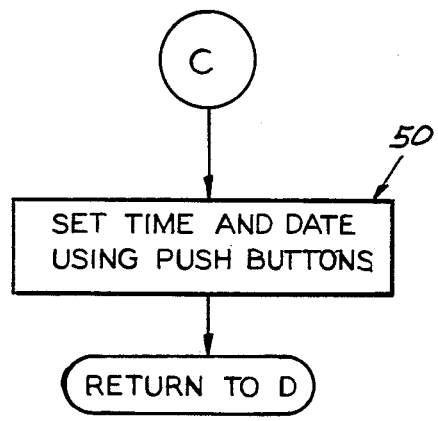
FIG. 7 is a flow chart showing a subroutine for setting the calendar and clock.

FIG. 7 illustrates the procedure for setting the time and date of the calendar. For this purpose, the keys of the keypad are used in the conventional manner, to set first the date and then the time, advancing from each number entry to the next by depressing a non-numerical key. After this, control returns to the executive routine over path "D".

Figure 8:
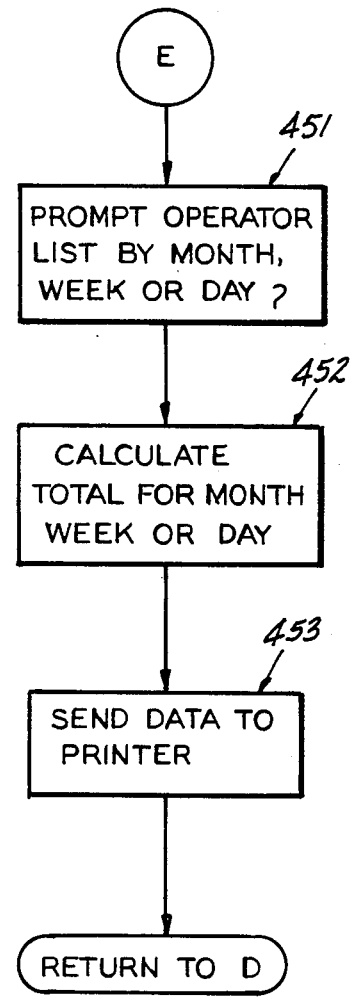
FIG. 8 is a flow chart showing a procedure for producing a printed report.

FIG. 8 illustrates the printing routine, which is entered when the print key is found to be depressed by unit 45 (FIG. 5). Unit 451 first receives control and displays on the display unit 19 a prompt which informs the operator that the keypad should be used to enter information corresponding to the time period desired to be listed. This may be by month, week or day, with the respective month, week or day designated by use of the number keys of the keypad. Then unit 452 receives control, which scans the entries for telephone calls made during the selected period, and calculates the total. Then unit 453 receives control which sends the data to the printer in the conventional way, for example, using a conventional "Centronics" type printer interface.

FIG. 9 illustrates a memory map of data stored in the EPROM, which controls operation of the CPU, as well as storing data required for the calculations. The top area of the EPROM memory stores programs, with an NPA or area code list being stored directly after the program, and NPA lookup data being stored directly thereafter. In the next area of memory, the prices for the first minute and subsequent minutes are stored for all possible long distance phone calls, for different distances, and for different periods of the day or week for which discount prices are available. This information includes intrastate prices and interstate prices both, as well as the discount schedule for various days and times. Following this, a list of state abbreviations is stored, for retrieval during the print procedure so that the state of the call destination can be listed on the printed report. In such case, the abbreviation data is displayed corresponding to the area code of each respective call. The next area is reserved for general storage of data such as configuration parameters, call pointers, etc.

In the highest area of storage, there is a list of all possible calls to anywhere in the continental United States, stored by MPA, and with all exchange numbers associated with every central office in that NPA. Each entry for such exchange includes data corresponding to a mileage band, and a code identifying the type of call. This data is all the data necessary for calculating local and long distance charges, both for the initial minute and for successive minutes.

The data stored in the EPROM is preferably customized to the area code and central office associated with the user's telephone line. Thus, is is not necessary to store the cost information required to calculate the cost of a call from anywhere to anywhere. The EPROM may be readily replaced with a substitute EPROM, storing different cost data, if it should be desired to move the apparatus for connection to a telephone line with a different area code or central office.

As described above, the apparatus of the present invention is small and compact enough to be located either within the telephone instrument itself as shown in FIG. 1A, or in a small, light, inexpensive unit which may be placed at any convenient location. All calling information is maintained permanently in memory, until the capacity of the memory is reached, after which the memory is overwritten, starting from the initial location, so that the older calls are overwritten first. It is contemplated that the memory capacity is sufficient to store at least two months of telephone activity, so that the last month's telephone activity is always available for display or printout, during any current month.

No special entry need be made by the operator in order to use the present invention, since the addition of call data to the stored memory area occurs automatically, without any special data entries by the operator. This insures that data is not lost through operator error in making data entries, or in failing to make appropriate data entries.

The algorithms employed to perform the various functions of the blocks illustrated in FIGS. 3-8 are well within the purview of those skilled in the art, and so they need not be described specifically.

It is apparent that various modification and additions may be made in the apparatus of the present invention without departing from the essential features of novelty thereof, which are intended to be defined and secured by the appending claims.

What is claimed is:

1. A small and compact telephone accounting system incorporating a microprocessor,
   decoder means connected to a telephone line for decoding information signals on said telephone line and for producing signals corresponding to the status of telephone calls being made on said telephone line,
   memory means for storing a stored data base connected with said microprocessor,
   said microprocessor having a clock-calendar,
   said memory means incorporating stored programs for causing said microprocessor to automatically calculate the cost of telephone calls in progress in response to said decoded signals and to said data base without any operator input, and to store data corresponding to each such telephone call in said memory.

2. Apparatus according to claim 1, wherein said microprocessor and said decoder means are located within the enclosure of the standard size telephone.

3. Apparatus according to claim 1, wherein said microprocessor and said decoder are located in an enclosure of a size less than the size of a standard telephone.

4. Apparatus according to claim 1, including a display unit for displaying the duration of a telephone call in progress, the current cost of such call in progress, and the total cost of such call when such call is terminated.

5. Apparatus according to claim 1, wherein said memory has means for storing, for each said telephone call, the number called, the total cost of the call, the time, the date, and the call duration.

6. Apparatus according to claim 5, including a display device and means for causing said display device to display said stored information.

7. Apparatus according to claim 6, including means for accumulating the total cost of telephone calls made during a selected period of time, whereby said display unit displays the total cost of telephone calls made during such period.

8. Apparatus according to claim 6, including means for connecting said apparatus to a printer, to produce a printed report listing all of the calls made during said selected period, with the total cost of such calls.

9. Apparatus according to claim 1, wherein said memory means includes a stored data base comprising all information necessary to calculate the cost of any long distance telephone call within the continental United States.

10. A small and compact telephone accounting system device comprising:
   a microprocessor internally housed within said device;
   decoder means connected to a telephone line for decoding information signals on said telephone line and for producing signals corresponding to the status of telephone calls being made on said telephone line;

memory means for storing information relating to said telephone calls connected to said microprocessor;

said memory means being internally housed within said device; and said memory means including a customized stored data base comprising all information necessary to calculate the cost of a telephone call and stored programs for causing said microprocessor to automatically calculate the cost of telephone calls in progress in response to said decoded signals and to said data base without any operator input and to store data corresponding to each such telephone call in said memory.

* * * * *